(12) United States Patent
Williams et al.

(10) Patent No.: US 7,420,106 B2
(45) Date of Patent: Sep. 2, 2008

(54) SCANNING PROBE CHARACTERIZATION OF SURFACES

(75) Inventors: Clayton C. Williams, Salt Lake City, UT (US); Ezra B. Bussmann, Salt Lake City, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 147 days.

(21) Appl. No.: 11/375,867

(22) Filed: Mar. 15, 2006

(65) Prior Publication Data

US 2006/0225164 A1    Oct. 5, 2006

Related U.S. Application Data

(60) Provisional application No. 60/663,364, filed on Mar. 18, 2005.

(51) Int. Cl.
*G01N 23/00* (2006.01)
*G21K 7/00* (2006.01)

(52) U.S. Cl. .................. 977/852; 977/849; 977/854; 977/860; 977/861; 977/862; 977/863; 977/864; 250/306; 250/307; 250/310; 324/456; 324/690; 324/754

(58) Field of Classification Search .................. 250/307; 977/852
See application file for complete search history.

(56) References Cited

U.S. PATENT DOCUMENTS

| | | | |
|---|---|---|---|
| 5,267,471 A * | 12/1993 | Abraham et al. | 73/105 |
| 5,317,141 A * | 5/1994 | Thomas | 250/491.1 |
| 5,329,514 A * | 7/1994 | Eguchi et al. | 369/126 |
| 5,412,597 A * | 5/1995 | Miyazaki et al. | 369/126 |
| 5,438,206 A * | 8/1995 | Yokoyama et al. | 250/442.11 |
| 5,481,528 A * | 1/1996 | Eguchi et al. | 369/126 |
| 5,520,769 A * | 5/1996 | Barrett et al. | 438/14 |
| 5,535,185 A * | 7/1996 | Kishi et al. | 369/126 |
| 5,623,476 A * | 4/1997 | Eguchi et al. | 369/126 |
| 5,723,982 A * | 3/1998 | Yasue et al. | 250/306 |
| 5,744,704 A * | 4/1998 | Hu et al. | 73/105 |
| 5,880,360 A * | 3/1999 | Hu et al. | 73/105 |

(Continued)

OTHER PUBLICATIONS

Binning et al., "Atomic Force Microscope", Phy. Rev. Lett. 56 (9) 1986, 960-933.*

(Continued)

*Primary Examiner*—Bernard E Souw
(74) *Attorney, Agent, or Firm*—Workman Nydegger (57) ABSTRACT

Characterizing dielectric surfaces by detecting electron tunneling. An apparatus includes an atomic force probe. A mechanical actuator is connected to the atomic force probe. A mechanical modulator is connected to the mechanical actuator. The mechanical modulator modulates the mechanical actuator and the atomic force probe at the resonant frequency of the atomic force probe. An electrical modulator is connected to the atomic force probe. A feedback sensing circuit is connected to the mechanical modulator to detect movement of the atomic force probe and provide information about the movement of the atomic force probe to the mechanical modulator allowing the mechanical modulator to modulate the atomic force probe at the resonant frequency of the atomic force probe as the resonant frequency of the atomic force probe changes. An FM detector is connected to the feedback circuit detects changes in the resonant frequency of the atomic force probe.

25 Claims, 5 Drawing Sheets

U.S. PATENT DOCUMENTS

| | | | |
|---|---|---|---|
| 6,094,971 A * | 8/2000 | Edwards et al. ............... | 73/105 |
| 6,268,604 B1 * | 7/2001 | Boyadzhyan-Sevak ... | 250/338.1 |
| 6,369,385 B1 * | 4/2002 | Muray et al. ................ | 250/306 |
| 6,466,039 B1 * | 10/2002 | Gruverman ................ | 324/750 |
| 6,477,132 B1 * | 11/2002 | Azuma et al. ............... | 369/126 |
| 6,583,412 B2 * | 6/2003 | Williams .................... | 250/306 |
| 6,776,030 B1 * | 8/2004 | Kirpichnikov et al. ........ | 73/105 |
| 7,002,149 B2 * | 2/2006 | Shigekawa et al. .......... | 250/307 |
| 2002/0178802 A1 * | 12/2002 | Ookubo ...................... | 73/105 |
| 2004/0129064 A1 * | 7/2004 | Hinterdorfer et al. ......... | 73/105 |
| 2006/0225164 A1 * | 10/2006 | Williams et al. ............ | 977/852 |
| 2007/0194225 A1 * | 8/2007 | Zorn .......................... | 250/306 |

OTHER PUBLICATIONS

Sadewasser et al., "Integrated Tunneling Sensor for Nanoelectromechanical Systems", Appl. Phys. Lett. 89, 2006, 173101.*

Kenny et al., "Micromachined electron tunneling infrared sensors", Solid-State Sensor and Actuator Workshop, 1992, 5th Technical Digest., IEEE, Jun. 22-25, 1992.*

Marti et al., "Atomic force microscopy and scanning tunneling microscopy with a combination atomic force microscope/scanning tunneling microscope", J. Vac. Sci. Technol. A 6 (3) 1988, 2089-2092.*

Romain Stomp, Yoichi Miyahara, Scha Schaer, Qingfeng Sun, Hong Guo, and Peter Grutter, Sergei Studenikin, Philip Poole, and Andy Sachrajda Physical Review Letters "Detection of Single-Electron Charging in an Individual InAs Quantum Dot by Noncontact Atomic-Force Microscopy" pp. 056802-1 to 056802-4 Feb. 11, 2005 The American Physical Society, 4 pages.

Michael T. Woodside and Paul L. McEuen "Scanned probe imaging of single-electron charge states in nanotube quantum dots", 5 pages.

Applied Physics Letters 87, 242102 (2005) J. Zhu, M. Brink, and P.L. McEuen "Frequency shift imaging of quantum dots with single-electron resolution", 3 pages 2005 American Institute of Physics.

Institute of Physics Publishing Nanotechnology Aykutlu Dana Yoshihisa Yamamoto "Electrostatic force spectroscopy of near surface localized states", 9 pages 2005 IOP Publishing Ltd.

* cited by examiner

FIG. 10

SCANNING PROBE CHARACTERIZATION OF SURFACES

CROSS-REFERENCE TO RELATED APPLICATIONS

This application claims the benefit of U.S. Provisional Application No. 60/663,364, titled ATOMIC SCALE CHARACTERIZATION OF ELECTRONIC STATES NEAR INSULATING SURFACES filed Mar. 18, 2005, which is incorporated herein by reference in its entirety.

STATEMENT REGARDING FEDERALLY SPONSORED RESEARCH OR DEVELOPMENT

This invention was made with government support under grant numbers DMR-9626286 and DMR-0216711 by the National Science Foundation. The Government has certain rights to this invention.

BACKGROUND

1. The Field of the Invention

The invention is generally directed to measuring surface characteristics. More particularly, the invention is directed to measuring electron tunneling events and surface potentials of dielectric materials to characterize electronic states and/or defects with high spatial and/or energy resolution.

2. Description of the Related Art

Material science is directed towards the study of materials used in manufacturing various devices. One area of materials science is directed to characterizing surfaces of materials. In particular, it is often useful to be able to characterize surfaces of materials at an atomic level. For example, in the semiconductor device context, the ability to continue to scale semiconductor devices (implement more semiconductor devices in smaller amounts of space) requires that electronic defects in dielectric materials used in fabricating the semiconductor devices be understood. For example, silicon dioxide is a common dielectric material used in silicon semiconductor manufacturing. Due to impurities and other defects, the silicon dioxide may develop electron traps within the silicon dioxide. The electron traps result in loss of performance of semiconductor devices. The accumulation of these types of defects can limit the scalability of semiconductor devices. Presently, no atomic scale method exists for measuring the atomic scale location of the electronic defects in completely insulating materials.

Another material that is presently of interest is hafnium oxide. The use of hafnium oxide may help to further facilitate semiconductor scalability. However, hafnium oxide films may include significant defects which should be detected and understood.

It is also useful to understand other surfaces which are non-conducting or structures on non conducting surfaces. For example, it may be useful to study molecules on non-conducting surfaces or conducting structures on non-conducting surfaces.

It may also be useful to understand surface potentials on dielectric and non-conducting surfaces that may be associated which charge on the surface.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

One embodiment described herein includes a method of characterizing dielectric surfaces by detecting tunneling events. The method includes applying a first voltage at a given location on the dielectric surface. The voltage is of a sufficient strength, and applied within a distance from the dielectric surface where tunneling events are likely to occur. The method further includes detecting a tunneling event occurring as a result of applying the first voltage at the given location on the dielectric surface.

Another embodiment described herein includes an apparatus for characterizing electrical properties of a dielectric surface. The apparatus is able to detect locations on a dielectric surface where electron tunneling may occur. The apparatus includes an atomic force probe. A mechanical actuator is connected to the atomic force probe. A mechanical modulator is connected to the mechanical actuator. The mechanical modulator is configured to modulate the mechanical actuator and the atomic force probe at the resonant frequency of the atomic force probe. An electrical modulator is connected to the atomic force probe. A feedback sensing circuit is connected to the mechanical modulator. The feedback circuit is configured to detect movement of the atomic force probe and to provide information about the movement of the atomic force probe to the mechanical modulator to allow the mechanical modulator to modulate the mechanical actuator and the atomic force probe at the resonant frequency of the atomic force probe as the resonant frequency of the atomic force probe changes. An FM detector is connected to the feedback circuit and configured to detect changes in the resonant frequency of the atomic force probe.

Yet another embodiment described herein includes a method of characterizing a dielectric surface by detecting tunneling events. The method includes applying a first voltage through an atomic force probe at a given location on the dielectric surface. The voltage is of a sufficient strength, and applied within a distance from the dielectric surface where tunneling events are likely to occur. The atomic force probe mechanically modulated at the resonant frequency of the atomic force probe. A tunneling event is detected as a result of applying the first voltage at the given location on the dielectric surface by detecting a shift in the resonant frequency of the atomic force probe.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments are described herein illustrating methods for characterizing surfaces of non-conductive materials such as dielectric material. Notably, while the examples used herein use dielectric materials, it should be noted that other non-conductive materials may also be characterized. For example, the principles described herein can be applied at least to dielectric surfaces, non-conductive surfaces, and semiconductors with a sufficiently large band gap. Typically, dielectric materials are non conductive. However, a defect or other nanostructure in the dielectric material may enable the dielectric material to accept or lose charge carriers such as electrons. Notably, while defects are used as examples herein, it should be noted that embodiments of the invention can apply to defects, other nanostructures or nanoscale features, etc. The transfer of a charge carrier through an energy barrier is commonly referred to as a tunneling event. An energy barrier hinders current to flow. However, if a barrier becomes sufficiently thin, then an electron can tunnel through the barrier. The acceptance or loss of a charge carrier will change the surface potential of the dielectric material at the location where the charge carrier is accepted. Thus, one embodiment described herein illustrates the ability to locate defects by finding locations on a dielectric surface where charge carriers will be accepted or lost. Illustratively, in one embodiment a surface potential is measured at a particular location on a dielectric surface. An voltage is then applied to the dielectric surface at that particular location to attempt to cause a tunneling event to occur and a charge carrier to be accepted at the particular location. If a particular defect exists at the particular location, when the voltage is applied, an electron will tunnel to or from the defect and the surface potential at the particular location will change. As such, a second measurement may be performed at that particular location to determine the new surface potential at that particular location. If the difference between the first measurement of surface potential and the second measurement of surface potential is sufficiently large, the tunneling event can be detected. The detection of the tunneling event may be used to determine that a defect exists at the particular location on the dielectric surface. The measurement can be made at many locations on the surface. Tunneling can be achieved with atomic spatial resolution. As such, an image of the surface can be created illustrating the surface characteristics with atomic scale resolution.

Illustrating now a more detailed example, a metallic atomic force probe may be used in conjunction with other circuitry to both measure surface potentials and to apply voltages to cause tunneling events. For example, the probe may first be moved into a position near the dielectric surface that is outside of a distance at which electron tunneling is likely to occur. Then, various measurements may be performed using other measurements to measure the surface potential at a particular location. The metallic atomic force probe may then be moved into a position where tunneling is more likely to occur at the particular location on the dielectric surface. An voltage may then be applied between the dielectric surface and the metallic atomic force probe. If a defect exists at the particular location on the dielectric surface, the voltage will cause a charge carrier to be transferred to the dielectric surface at the particular location. The metallic atomic force probe may then be moved again to a position where tunneling is not likely to occur. Potentiometry measurements can then be repeated a second time. The second potentiometry reading can then be compared with the first potentiometry reading to determine if there has been a change in surface potential at the particular location. If the first and second potentiometry readings vary by a sufficient amount, a tunneling event can be detected at the particular location. This is an indicator that a defect exists at the particular location.

In some embodiments, the metallic atomic force probe can then be moved back into a position near the dielectric surface where tunneling is again likely to occur. An voltage of opposite polarity to the first voltage may then be applied to the dielectric surface so as to cause one or more charge carriers to be removed from the particular location on the dielectric surface so as to restore the dielectric surface at the particular location back to or near the surface potential that existed prior to the first voltage being applied. Additionally, a third potentiometry reading may then be taken to both verify that the dielectric surface is at the original surface potential and to confirm the reverse tunneling event. Notably, by applying voltages of opposite polarity, certain tunneling events that may not be detected by the first application of an electric filed may be detected by the second application of a voltage of opposite polarity. For example, if the defect in the dielectric material initially has a charge carrier such as an electron existing in the dielectric material, the application of the first voltage will likely not cause a tunneling event, where another electron is transferred to the dielectric material. However, application of a voltage of opposite polarity, may result in the extraction of the electron from the defect in the dielectric material. This tunneling event from the dielectric material to the probe can therefore be detected.

Figure 1:
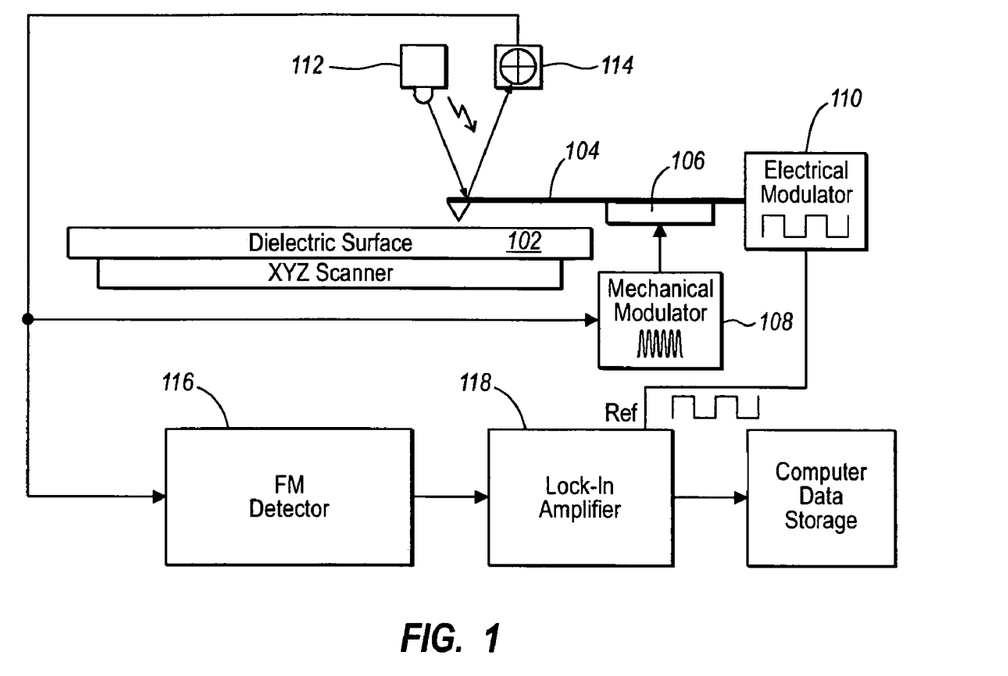
FIG. 1 illustrates an apparatus for detecting tunneling events.

Referring now to FIG. 1, one example of a method of performing AC potentiometry is illustrated. As shown in FIG. 1, a dielectric surface 102 is being characterized. To characterize the dielectric surface 102 an atomic force probe 104 is utilized. Connected to the atomic force probe 104 is a mechanical actuator 106. Connected to the mechanical actuator 106 is a mechanical modulator 108. The mechanical actuator 106 may be in one embodiment a piezoelectric crystal. The mechanical modulator 108 supplies a modulating electrical supply to the piezoelectric mechanical actuator 106 which causes the atomic force probe 104 to move. An electrical modulator 110 is electrically connected to the atomic force probe 104. The electrical modulator 110 in this example is also connected to a conducting substrate connect to the dielectric surface 102 or on which the dielectric surface 102 is grown. This allows the electrical modulator 110 to cause a voltage to exist between the atomic force probe and the dielectric surface 102.

The mechanical modulator 108 supplies an ac voltage to the mechanical actuator 106 to modulate the atomic force probe 104 at the resonant frequency of the atomic force probe 104. The atomic force probe a 104 is electrically modulated with the electrical modulator 110. In the example shown, the electrical modulator supplies an AC voltage of about 0.1 to 5V. The AC voltage is typically a square wave. The electrical field created between the atomic force probe and the dielectric surface 102 by the electrical signal applied by the electrical modulator 110 causes the atomic force probe 104 to have a change in resonant frequency. In effect, the AC voltage modulates the electrostatic force and force gradient sensed by the atomic force probe 104.

The mechanical modulator 108 can adjust the ac voltage supplied to the mechanical actuator 106 to facilitate the modulating the atomic force probe 104 at its resonant frequency as the resonant frequency changes. To sense changes in the resonant frequency of the atomic force probe 104, a laser 112 and quadrant detector 114 are used. As the mechanical actuator 106 vibrates, laser light from the laser 112 will be reflected onto different portions of the photodiode quadrant detector 114. A signal from the photodiode quadrant detector 114 can be fed back into the mechanical modulator 108 as feedback to allow the mechanical modulator 108 to adjust as the resonant frequency of the atomic force probe changes by adjusting the alternating current supplied to the mechanical actuator 106 thus supplying an electrical current to the mechanical actuator 106 that is able to stimulate the atomic force probe 104 to vibrate at its resonant frequency.

To detect the change in the resonant frequency of the atomic force probe 104, the signal from the photodiode quadrant detector 114 can be supplied to an FM detector 116. The FM detector is configured to detect changes in the frequency. These changes in frequency are provided to lock in amplifier 118. The lock in amplifier 118 senses changes in the frequency caused by the applied electrical modulator voltage at a fixed frequency. In the example shown in FIG. 1, the signal from the electrical modulator 110 is used as a reference signal for the lock in amplifier 118. As described previously, the square wave voltage from the electrical modulator 110 modulates the electrostatic force and gradient sensed by the probe at the frequency of the AC voltage. The following are the equations for the force and force gradient.

$$F = \tfrac{1}{2} c V^2$$

$$F' = \tfrac{1}{2} c' V^2 = (V_{sq} + V_{DC})^2$$

In the preceding equation, c is the tip sample capacitance. The variable c' is the derivative of c with respect to the gap between the atomic force probe 104 and the dielectric surface 102. When the average voltage ($V_{DC}$) on the probe is equal to the surface potential of the dielectric surface sample (i.e. flat band voltage), the applied square wave voltage ($V_{sq}$) from the electrical modulator 110 will not cause a frequency shift on the atomic force probe 104 because the force gradient, as illustrated in the force gradient equation above, is dependent on the square of the electric potential between the tip of the atomic force probe 104 and the dielectric surface 102. However, a variation in the surface potential, i.e. when $V_{DC}$ is non-zero, near the probe will cause a modulation of the resonant frequency of the atomic force probe 104 at the frequency of the AC square wave voltage applied by the electrical modulator 110. This frequency modulation is proportional to the force gradient between the atomic force probe tip and dielectric surface 102 and is detected by the FM detector 116 and subsequently the lock-in amplifier 118 with a reference signal in phase with the signal supplied by the electrical modulator 110. A variation in the charge at the dielectric surface 102 by even a single electron produces a detectable lock-in amplifier signal.

Illustrating now how surface potentials on the dielectric surface 102 are measured using AC potentiometry, the atomic force probe 104 is modulated at its resonant frequency by the mechanical modulator 108 and the mechanical actuator 106. As described previously, the electrical modulator 110 being connected to the atomic force probe 104 causes a square wave voltage to exist between the dielectric surface 102 and the atomic force probe 104. This square wave voltage results in a change of the resonant frequency of the atomic force probe 104 dependant on the sample surface potential. This change in resonant frequency is measured by the FM detector 116. Notably, any surface potential that already exist on the dielectric surface 102 at that particular location where the surface potential is being measured will affect the modulation of the resonant frequency of the atomic force probe 104. In particular, the result of a different surface potential existing on the dielectric service 102 at the location where the surface potential is being measured will result in the output of the FM detector having a square wave output with an amplitude that is proportional to the amplitude of the DC surface potential. This square wave output will be detected by the lock in amplifier and can be used as a measurement of surface potential.

AC potentiometry as described above may be used to image a surface to characterize surface potentials on the surface as function of location. This may be performed without the need to perform the electron tunneling described elsewhere herein. A graphical image can then be created illustrating surface potentials on the dielectric surface 102.

Illustrating now a full example, a measurement of the surface potential of the dielectric surface 102 at a particular location can be measured using AC potentiometry as described above. In one embodiment, the electrical signal applied by the electrical modulator 110 can be adjusted in its average voltage so that the first potentiometry reading is close to zero.

The atomic force probe 104 can then be moved to a position where tunneling of charge carriers from the atomic force probe 104 to the dielectric surface 102 are likely to occur. A first voltage can then be created by applying a DC voltage to the atomic force probe 104. If a defect exists on the dielectric surface 102 at the particular location, a charge carrier such as an electron will tunnel from the atomic force probe to the dielectric surface 102 at the particular location.

This will result in a surface potential of the dielectric surface 102 at the particular point being changed by a given amount due to the addition of one or more additional charge carriers. The atomic force probe 104 is then moved vertically to a position where tunneling is not likely to occur. AC potentiometry readings are then again taken of the dielectric surface 102 at the particular point. These first and second potentiometry readings are then compared to determine if a tunneling event occurred at the particular location of the dielectric surface 102.

As explained previously, some embodiments contemplate that the atomic force probe 104 can then be moved into position again to where a tunneling event is likely to occur at the particular point above the dielectric surface 102. A second voltage that is opposite in polarity to the first voltage can be applied between the atomic force probe 104 and the dielectric surface 102. This may be performed to restore the dielectric surface 102 at that particular location to a surface potential that existed prior to measuring for detecting tunneling events on the dielectric surface at the particular location. Further measurements at the particular location using AC potentiometry as described previously herein can be further conducted to determine that the dielectric surface 102 has returned to the original surface potential at the particular location and/or that a tunneling event occurred when a voltage of the opposite polarity was applied between the dielectric surface 102 in the atomic force probe 104. As noted above, when the second voltage is used, defects that were not detectable using the first voltage may be detectable with the second voltage. This is due to the type of defect that exists and what charge carriers are present (or not present) in the defect prior to application of the first voltage.

In the example above, several actions are performed. For example, (1) the tip of the atomic force 104 is brought close to the surface of the dielectric surface 102, (2) the tip of the atomic force probe 104 is moved to just out of tunneling range and an AC potentiometry signal is read, (3) the tip of the atomic force probe 104 is then moved into tunneling range where a DC voltage pulse is applied to cause a tunneling event, (4) the tip of the atomic force probe 104 is then pulled out of tunneling raged where second AC potentiometry signal is read to determine if an electron has tunneled, (5) the tip of the atomic force probe 104 is then moved into tunneling range where a DC voltage pulse of opposite polarity to the first DC voltage pulse is applied to cause a tunneling event where an electron tunnels in an opposite direction from the first tunneling event, (6) the tip of the atomic force probe 104 is then pulled out of tunneling range where an AC potentiometry signal is read to determine if an electron has tunneled. In one embodiment, the speed of the measurement may be increased by leaving out the first AC potentiometry reading. Additionally, under some conditions, the probe height modulation may not be performed. For example, in cases where the AC potentiometry reading will not affect the surface potential, there may be no need to move the atomic force probe 104 to a height that is out of tunneling range.

For the example illustrated in FIG. 1, the AC potentiometry measurements may be performed in an ultra high vacuum condition with a commercially available atomic force microscope. For example, in one embodiment an OMICRON Multiprobe S may be used. Platinum metal coated forced probes such as Mikromasch 17/Pt may be used for measurements. Typical metal coated forced probes have a resonant frequency of about 300 kilohertz and have a cantilever stiffness of 50 Newtons per meter. Notably, other conditions may be used as well including performing the measurements in free air. The atomic force probe 104 is modulated with an amplitude of about 10 nm. Other amplitudes may be used as well. The electrical modulator 110 may be for example a square wave of about 0.1 to 3V amplitude at 400 to 600 Hz. Notably, other values may also be used.

Figure 2:
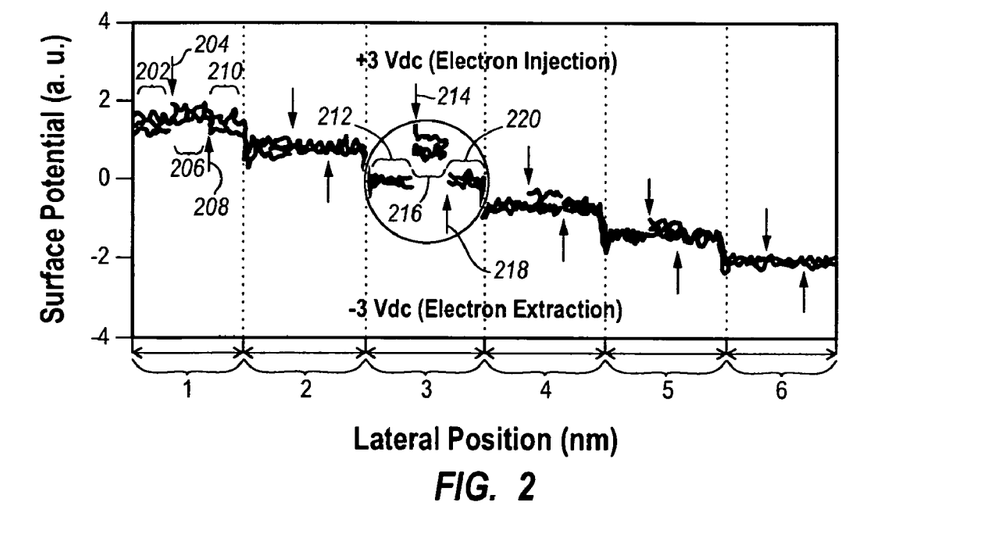
FIG. 2 illustrates a graph showing detected events.

Referring now to FIG. 2, exemplary surface potential measurements that may be obtained are shown. FIG. 2 illustrates a graph which shows surface potential as a function of lateral position and as a function of electron injection. For example, FIG. 2 illustrates measurements and actions taken when a particular location on a dielectric surface is being measured as noted in the lateral position 1. At 202 ac potentiometry measurements are taken at the lateral position 1 which results in a reading of a surface potential of slightly below two arbitrary units. At 204 electron injection is attempted by using a 3 volt DC electrical source to create an electrical field between the atomic force probe and the dielectric surface. At 206, another potentiometry reading is taken which illustrates that the surface potential increases slightly but probably not enough to indicate the occurrence of a tunneling event. At 208, electron extraction is attempted by applying a −3 volt DC voltage across the atomic force probe and dielectric surface. At 210, a potentiometry measurement is made which again illustrates a slight lowering of the surface potential, but probably not enough to indicate that a tunneling event from the attempted electron extraction has occurred.

Tunneling and potentiometry measurements are performed at each of the lateral positions illustrated. At lateral position 3, for example at 212, a potentiometry reading is performed which results in a reading of zero atomic units for the surface potential at lateral position 3. An electron is injected at 214 using methods previously described herein. A potentiometry reading is taken at 216. Notably, the potentiometry reading results in a reading that indicates that the surface potential at lateral position 3 has increased by about one arbitrary unit. This is a fairly good indication that a tunneling event has occurred where an electron has been injected and accepted at the dielectric surface 102. At 218, an opposite polarity voltage is applied between the atomic force probe and dielectric surface. A potentiometry reading at 220 indicates that the dielectric surface at lateral position 3 has again returned to the original surface potential measured at 212.

The method of characterizing the dielectric surface 102 described above may be performed in a manner where electron tunneling and AC potentiometry readings are performed in a number of locations in an ordered manner so as to perform an imaging operation of the electrical characteristics of the dielectric surface. For example, a raster type scan of the dielectric surface 102 may be performed where the described sequences above are performed at each location of a raster scan at regular intervals. For example, the dielectric surface 102 may be divided into a grid with the intervals of 0.1 to 5 nm across the grid. The sequence described above can then be performed at each interval of the grid. The sequence of measurements can then be used to create a computer image of the dielectric surface identifying the locations of the electron defects.

If a raster type scan is performed across the dielectric surface 102, it may be desirable to maintain the atomic force probe 104 at a constant height from the dielectric surface 102 to perform AC potentiometry readings and at a different constant height when applying the voltage for stimulating tunneling events. This may be accomplished in a number of different ways. For example, in one embodiment topographic feedback may be used to maintain the atomic force probe 104 at a constant height above the dielectric surface 102. In one embodiment, a height characterization of the dielectric surface 102 may be performed prior to performing the tunneling event and surface potential characterization of the dielectric surface 102. This allows height information of the dielectric surface 102 to be used when performing the potentiometry scans and tunneling event excitations to be performed while maintaining constant distances between the atomic force probe 104 and the dielectric surface 102. Examples of height characterization measurements will now be described in the following paragraphs.

A method for characterizing the height of the dielectric surface 102 may include imaging the dielectric surface, where the imaging includes lightly tapping the atomic force probe 104 on the dielectric surface 102. The tapping causes a repulsive force gradient that increases the frequency of the force probe from the free natural resonance frequency.

In one embodiment, it may be desirable to image the surface, not by tapping in a repulsive mode, but actually to work in what is called attractive mode during an AFM (Atomic Force Microscopy) procedure. In AFM, the atomic force probe 104 can be vibrated or oscillated at its resonant frequency. The attractive force when the probe gets close to the surface alters the oscillation to provide a frequency shift of the resonant frequency which can be used to characterize height, or to keep height constant during the imaging process to detect electron defects.

Notably, other height characterizations may alternatively performed to characterize the height of locations on the dielectric surface 102. For example, a contact mode height characterization may be performed where a probe maintains contact with the dielectric surface 102 to characterize height. Changes in the height of the dielectric surface 102 can be sensed as changes in probe height.

Figure 3:
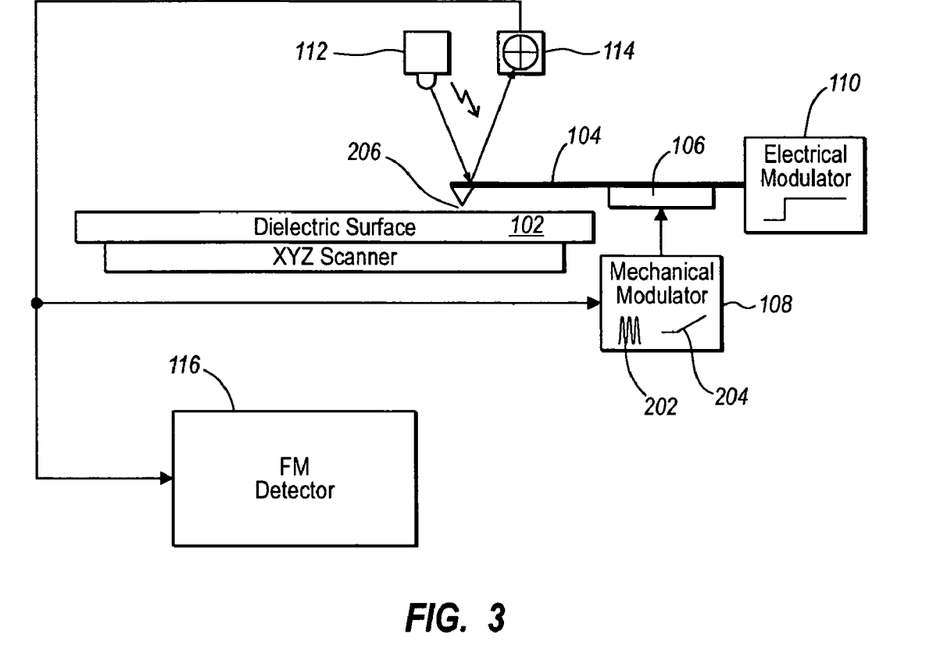
FIG. 3 illustrates an apparatus for detecting tunneling events.

Referring now to FIG. 3, an embodiment is illustrated where tunneling events may be caused and potentiometry readings may be made by varying the gap between the atomic force probe 104 and the particular location of the dielectric surface 102. In this example, the atomic force probe 104 is mechanically modulated by a first mechanical signal 202 that is at the resonant frequency of the atomic force probe 104. In addition, the atomic force probe 104 is further modulated by a mechanical distance signal 204 which causes the atomic force probe 104 to vary the gap between the atomic force probe 104 and the dielectric surface 102. While the first mechanical signal 202 and the mechanical distance signal 204 are shown as being of a certain magnitude with respect to each other, the representations in FIG. 3 are exemplary only and are in nowise intended to represent the actual comparative amplitude. In the example shown in FIG. 3 the electrical modulator 110 delivers a constant DC voltage to modulate the atomic force probe 104. The mechanical distance signal 204 is shown as being a ramped DC voltage.

Illustrating now a full example, the atomic force probe 104 is modulated by the first mechanical signal 202 at the resonant frequency of the atomic force probe 104. The atomic force probe 104 is further modulated by a signal from the electrical modulator 110. In this example the electrical signal from the electrical modulator 110 is a constant DC voltage. The signal from the electrical modulator 110 causes an electrical field to be created between the atomic force probe 104 and the dielectric surface 102. The atomic force probe 104 is modulated by the mechanical distance signal 204 which in this example is a ramped DC signal. Mechanically modulating the atomic force probe 104 with the mechanical distance signal 204 causes the mechanical force probe 104 to vary the gap 206 between the particular location on the dielectric surface 102 and the tip of the atomic force probe 104. As the atomic force probe 104 is moved closer to the dielectric surface 102, the atomic force probe 104 moves to a distance from the dielectric surface 102 where a tunneling event is likely to occur. If a defect exists in the dielectric surface 102 at the particular location, a tunneling event may occur caused by the voltage existing as a result of the electrical modulation from the electrical modulator 110. This tunneling event may be sensed as a change in resonant frequency of the atomic force probe 104 in a manner similar to that described previously herein in conjunction with FIG. 1. However, in this example, the tunneling event may be detected as a shift in frequency by monitoring the output signal from the FM detector 116.

Figure 4:
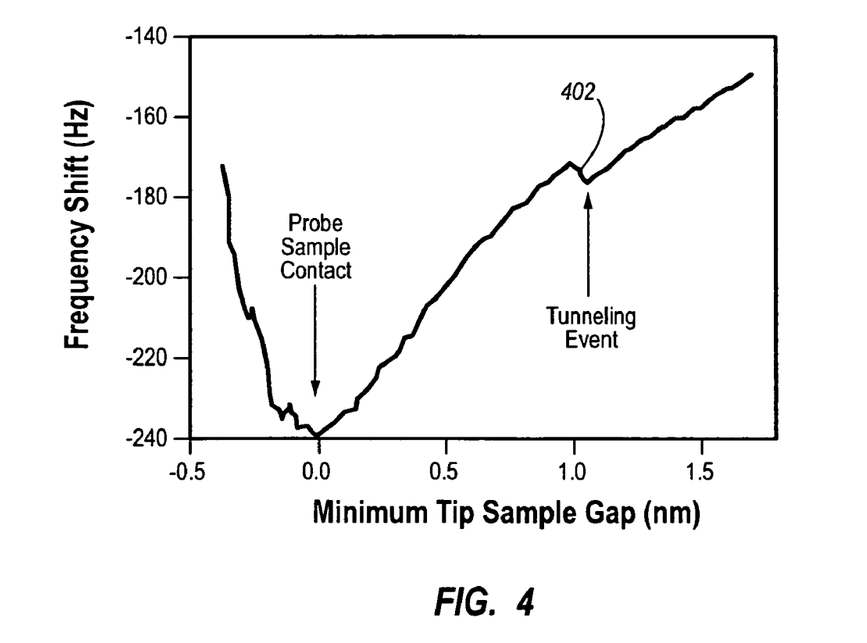
FIG. 4 illustrates a graph showing detected events.

Referring now to FIG. 4, an example of tunneling event detection is illustrated. At the rightmost portion of the graph illustrated in FIG. 4 the resonant frequency of the atomic force probe 104 is graphed with respect to the gap 206 between the atomic force probe 104 and the dielectric surface 102. As shown in FIG. 4, the representation of the gap 206 is a representation of the minimum tip sample gap which takes into account the modulation due to the first mechanical signal 202 noting that a probe height minimum will exist due to the modulation of the first mechanical signal 202. Thus the minimum tip sample gap shown in FIG. 4 is not the absolute value of the gap 206 but rather illustrates the gap 206 distance at the minimum point of the tip oscillation cycle caused by the modulation due to the first mechanical signal 202. The graph in FIG. 4 illustrates the atomic force probe gap being closer to the dielectric surface 102 when the graph is read from a right to left. When the minimum gap distance 206 is at about one nanometer, a tunneling event occurs as it is illustrated by the discontinuity 402 shown on the graph in FIG. 4. This tunneling event can be detected as a discontinuous shift in the resonant frequency of the atomic force probe 104. Notably, it can be observed that the resonant frequency of the atomic force probe 104 shifts as the atomic force probe moves toward the dielectric surface 102. However, when no tunneling events are occurring, the frequency shift is generally a continuous shift. When a tunneling event occurs, the frequency shift has a discontinuous abrupt feature as illustrated at 402.

Figure 5:
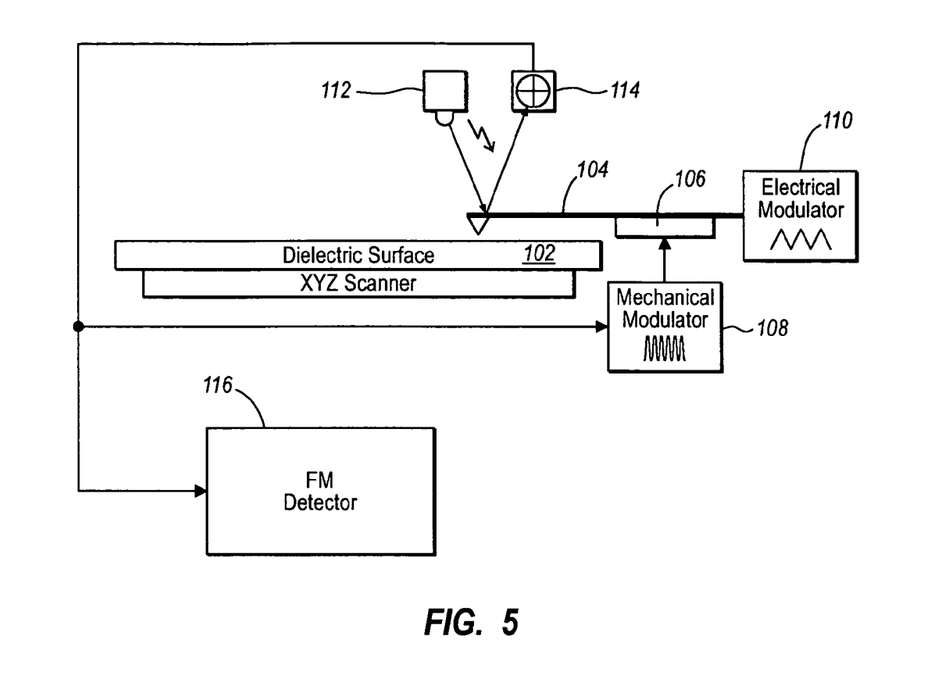
FIG. 5 illustrates an apparatus for detecting tunneling events.

Referring now to FIG. 5, another method of detecting tunneling events is illustrated. FIG. 5 illustrates the atomic force probe 104 being modulated by a mechanical modulator 108. The atomic force probe is modulated mechanically by the mechanical modulator 108 at the resonant frequency of the atomic force probe 104. The atomic force probe 104 is further modulated by an electrical modulator 110. In this example, the atomic force probe 104 is modulated by a triangular periodic wave. It should be noted however that the electrical modulator 110 may modulate the atomic force probe 104 with any one of a number of periodic or non periodic electrical signals and still be able to accomplish the functionality of the method illustrated in FIG. 5. In the example shown in FIG. 5, the atomic force probe 104 is positioned at a distance from the dielectric surface 102 such that tunneling events are likely to occur when the atomic force probe 104 is modulated with an appropriate electrical signal. In the example shown, the signal from the electrical modulator will cause a frequency shift of the resonant frequency of the atomic force probe 104. When modulated in a continuous fashion such as by a continuous ramp of a DC voltage, the frequency shift of the atomic force probe will generally respond in a continuous manner. However, when a tunneling event occurs, the frequency shift of the resonant frequency of the atomic force probe 104 will include a discontinuous or abrupt frequency change.

Figure 6:
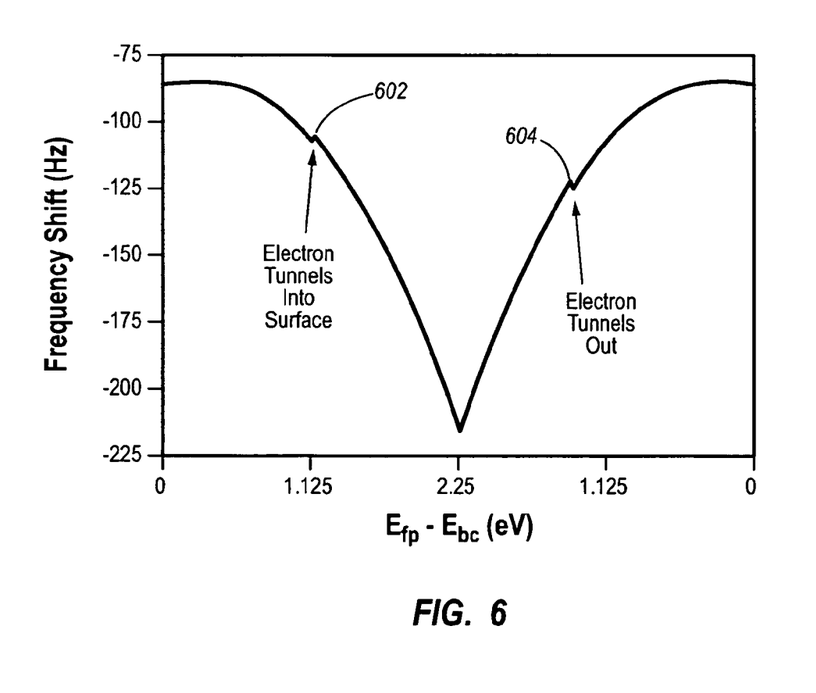
FIG. 6 illustrates a graph showing detected events.

This is illustrated in FIG. 6 which graphs resonant frequency shift versus voltage of the electrical modulator signal. In particular, the example shown in FIG. 6 graphs the frequency shift against the difference in voltage between the atomic force probe 104 and the dielectric surface 102. In the example shown in FIG. 6, tunneling events occur at the points located at 602 and 604.

Figure 7:
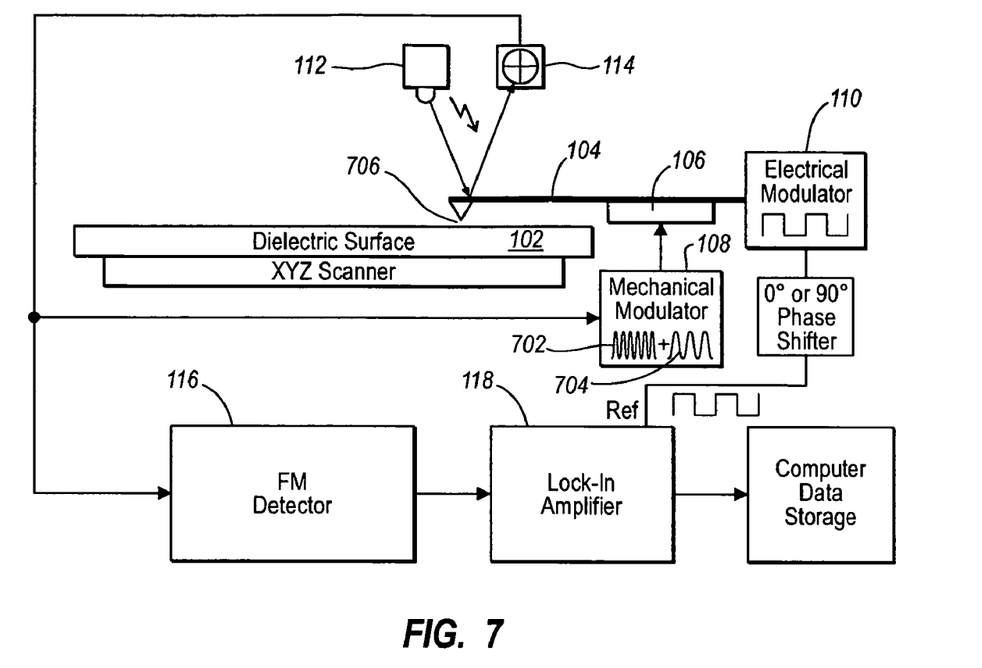
FIG. 7 illustrates an apparatus for detecting tunneling events.

Referring now to FIG. 7 another exemplary method of detecting tunneling events is illustrated. In the example shown in FIG. 7 the atomic force probe 104 is mechanically modulated by both a resonant frequency modulation signal 702 and a gap height signal 704. Additionally, the atomic force probe 104 is electrically modulated by the electrical modulator 110. The example shown in FIG. 7 is very similar to the example shown in FIG. 1. However, the example shown in FIG. 7 includes a modulation of the gap height 706 between the atomic force probe 104 and the dielectric surface 102. The function of the circuit shown in FIG. 7 is best understood by reference to FIG. 8 which shows an AC voltage 802 which in this example is the voltage supplied by the electrical modulator 110. The AC voltage 802 may be for example a square wave ac voltage in the range of about 0.1 to 10 V.

Figure 8:
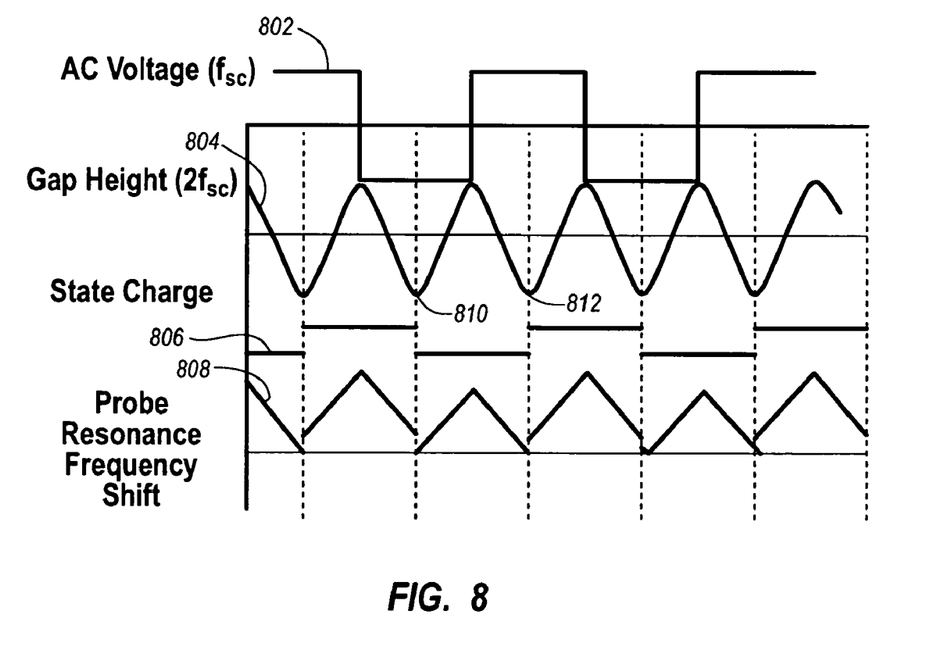
FIG. 8 illustrates a graph showing applied voltage and tip movements.

FIG. 8 further shows a gap height 804 which in this example is controlled by the gap height signal 704 (see FIG. 7). In the embodiment shown, the gap height is modulated at a frequency that is twice the frequency of the AC voltage 802 electrically modulating the atomic force probe 104. The gap height 804 may be modulated up and down by 2 to 3 nm in a sinusoidal motion. As with most values stated explicitly herein, the gap height 804 may be larger or smaller than the stated value.

FIG. 8 further shows a state charge 806 which is a representation of the surface potential of the dielectric surface 102. FIG. 8 further shows a resonant frequency shift 808 which illustrates the shift in resonant frequency of the atomic force probe 104.

In the example shown, the atomic force probe 104 has its gap height modulated at a frequency that is twice the frequency of the electrical modulation signal 802 supplied by the electrical modulator 110. This allows for the atomic force probe to be placed in a position where tunneling events will occur to cause a tunneling event to occur and to be placed out of a position where tunneling events occur. As illustrated, the AC voltage 802 is modulated in a square wave fashion so as to create a positive voltage between the atomic force probe 104 and the dielectric surface 102 and a negative voltage between the atomic force probe 104 and the dielectric surface 102 at different times. The gap height 804 has a minimum that occurs within each of these opposite polarity electrical fields. For example, the gap height 804 has a minimum illustrated at 810 which occurs when the AC voltage causes a negative electrical field between the atomic force probe 104 and the dielectric surface 102 at 812. The gap height 804 has a minimum when the electrical field is positive between the atomic force probe 104 in the dielectric surface 102. Thus the shuttling of charge carriers such as electrons back and forth between the dielectric surface 102 and the atomic force probe 104 can be seen by monitoring the probe resonance frequency shift 808 as will be explained in more detail below.

Due to the motion of the atomic force probe 104 tip moving in and out of the tunneling range, electron tunneling occurs 90° out of phase with respect to the signal provided by the electrical modulator 110. Using this, the electrostatic force due to tunneling can be separated by phase from background electrostatic force signals. In one embodiment, this two way tunneling, as described above, produces a periodic signal which is detected as a frequency modulation of the resonant frequency of the atomic force probe 104 at the frequency of the signal supplied by the electrical modulator at approximately a 90° phase shift. The two way tunneling signal can be detected by a lock-in amplifier 118 that has a reference signal that is 90° out of phase with the signal provided by the electrical modulator 110. Using a second lock-in amplifier, the average surface potential can be detected by the second lock-in amplifier having a 0° phase shift, i.e. in phase, from the signal provided by the electrical modulator 110. In one embodiment, a single lock-in amplifier may be used by adjusting the reference signal and taking measurements at separate times.

DC tunneling spectroscopy can be performed at locations where tunneling events are detected. DC tunneling spectroscopy provides a means whereby characterization of the energy of the defect states in the dielectric surface 102 at these locations can be accomplished. For example, in one embodiment, similar to the embodiment shown in FIG. 5, the atomic force probe 104 tip may be placed in tunneling range, about 1-2 nm from the dielectric surface. A dc voltage may be ramped by the electrical modulator 110 electrically modulating the atomic force probe 104. By ramping the electrical modulator voltage, the Fermi level of the tip of the atomic force probe 104 is scanned relative to the states at the surface. When the Fermi level of the surface is near the energy of a given state, and the tip is within tunneling range of that state, individual electrons will tunnel to or from the state in the sample, producing a signal discontinuity detectable at the FM detector. The measurement of the applied DC voltage at which this occurs, with some additional modeling to determine the voltage dropped across the gap between the tip of the atomic force probe 104 and the dielectric surface 102, will provide a means for directly measuring the energy of the states at the dielectric surface.

DC tunneling spectroscopy can also be performed by using atomic force probe height modulation such as that shown in FIG. 3. In this embodiment, the tip of the atomic force probe 104 is place above the dielectric surface at an appropriate gap. In one embodiment, the gap may be 2 to 3 nm at the minimum of the probe resonant oscillation. A fixed DC voltage is applied to the atomic force probe 104. In one embodiment, the fixed DC voltage may be 3 to 4V. The atomic force probe 104 is scanned toward the surface to a smaller gap. In the example shown, this is about 0 to 0.5 nm. The atomic force probe 104 is then retracted to its original starting height. Electron tunneling events and the gap at which they occurred can be recorded from this activity. The graph in FIG. 4 illustrates a tunneling event detected in just such a fashion.

The height scan can be used for DC tunneling spectroscopy because the potential difference between the atomic force probe 104 and the dielectric surface 102 depends on the gap between them. Electrons will tunnel between the atomic force probe 104 and dielectric surface 102 at various gaps depending on the states available in the dielectric surface 102. Appropriate modeling can then be used to determine the states at locations on the dielectric surface 102.

Figure 9:
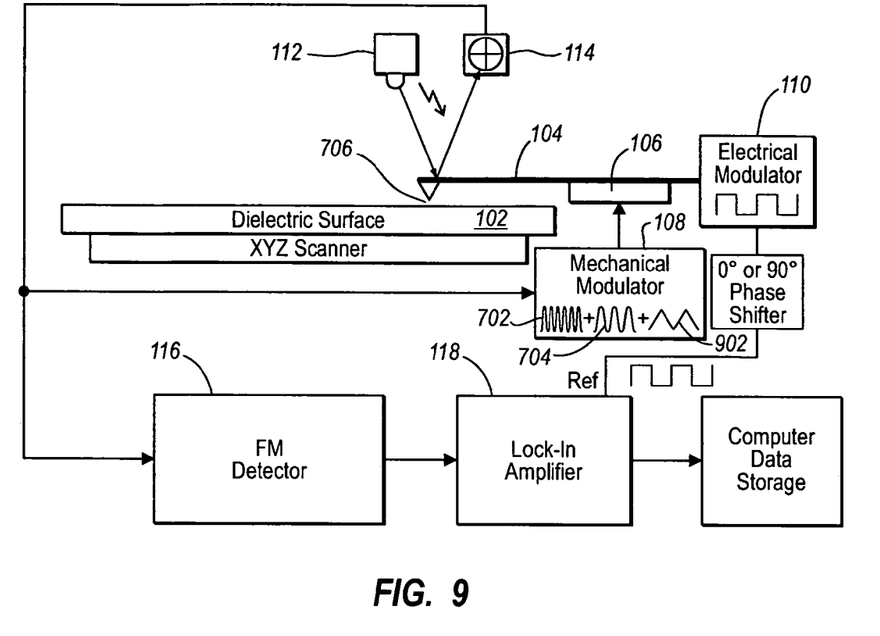
FIG. 9 illustrates an apparatus for detecting tunneling events as a function of height.

Similarly, AC spectroscopy measurements may be made. AC spectroscopy measurements detect electrons shuttling back and forth at either a particular height or a particular voltage as opposed to a single tunneling event at a particular height or a particular voltage as discussed above in regards to DC spectroscopy. Circuitry similar to that shown in FIG. 7 and signals applied (FIG. 8) can be used to perform AC spectroscopy. For example, FIG. 9 illustrates a circuit that can be used to perform AC spectroscopy by detecting shuttling electrons at a particular height. In FIG. 9, the circuit of FIG. 7 has been modified such that the mechanical modulator further produces a height scan signal 902. In this example, the spectroscopy signal is a lower frequency triangular wave. For perspective, a resonant frequency modulation signal 702 may be in the range of 300 KHz, the gap height signal 704 may be in the range of 300 Hz and height scan signal 902 may be in the range of 0.05 Hz. The height scan signal 902 slowly modulates the tip of the atomic force probe 104 in and out of tunneling range. When the atomic force probe 104 is modulated into tunneling range, electrons begin to tunnel back and forth between atomic force probe 104 and the dielectric surface 102. The height(s) at which the electrons begin to tunnel and cease tunneling can be recorded and used to determine the energy or depth of the states or defects in the dielectric surface using various modeling techniques.

Figure 10:
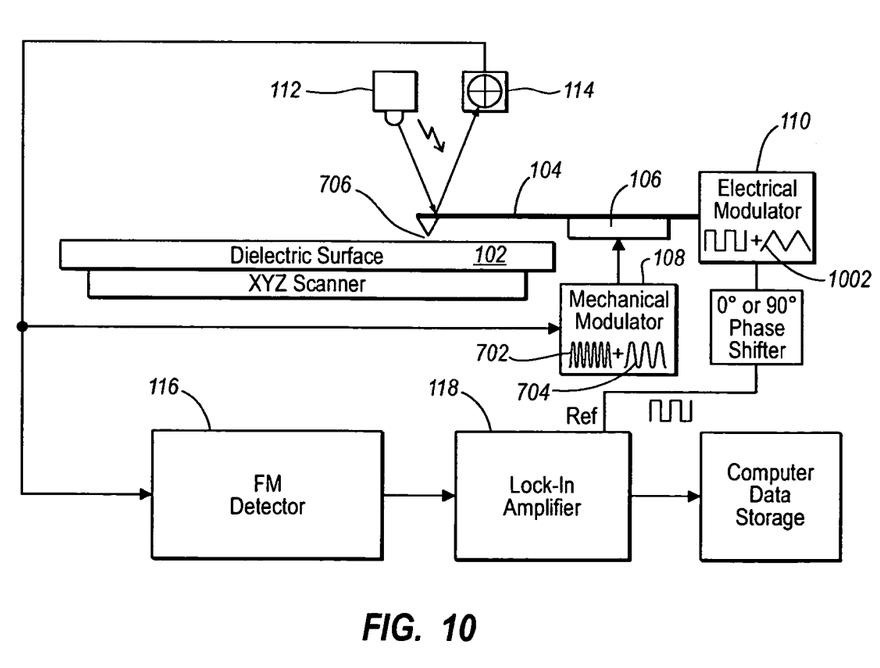
FIG. 10 illustrates an apparatus for detecting tunneling events as a function of voltage.

Similarly AC spectroscopy is seen in FIG. 10, where a voltage scan signal 1002 is applied to the atomic force probe 104. This voltage scan signal 1002 moves the Fermi level of the tip past the defect state energies allowing the square wave voltage to shuttle an electron to and from the state. By measuring the voltage at which shuttling occurs one can determine the energy of the state.

While certain actions described herein are described in a particular order, the particular order is not always necessary. Thus, as claimed in the following claims, the embodiments claimed herein are not limited to the order of actions claimed. Additionally, while some specific values have been disclosed, the embodiments of the invention are not limited to these values.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method of characterizing a dielectric surface by detecting tunneling events, the method comprising acts of:
    applying a first voltage at a given location on the dielectric surface, the voltage being of a sufficient strength, and applied within a distance from the dielectric surface where tunneling events are likely to occur; and
    detecting a tunneling event occurring as a result of applying the first voltage at the given location on the dielectric surface.

2. The method of claim 1, wherein the acts of claim 1 are performed by:
    measuring the surface electric potential at the given location on the dielectric surface to obtain a first measurement;
    applying a first voltage at the given location on the dielectric surface;
    measuring the surface electrical potential again at the given location after applying the voltage at the given location to obtain a second measurement; and
    determining if a tunneling event has occurred by comparing the first measurement to the second measurement.

3. The method of claim 2, further comprising:
    applying a second voltage at the given location on the dielectric surface, the second voltage being opposite in polarity to the first voltage;
    measuring the surface electrical potential again at the given location after applying the voltage at the given location to obtain a third measurement; and
    determining if a tunneling event has occurred by comparing the second measurement to the third measurement.

4. The method of claim 2, wherein:
    measuring the surface electric potential at a given location on the dielectric surface to obtain a first measurement comprises positioning an atomic force probe tip in a position that is out of tunneling range for the dielectric surface when using the atomic force probe tip to measure the electric surface potential at the given location on the dielectric surface;
    applying a first voltage at the given location on the dielectric surface comprises positioning the atomic force probe tip in a position that is in tunneling range for the dielectric surface when the atomic force probe is used to apply the first voltage; and
    measuring the surface electrical potential again at the given location after applying the voltage at the given location to obtain a second measurement comprises positioning the atomic force probe tip in a position that is out of tunneling range for the dielectric surface when using the atomic force probe tip to measure the electric surface potential again at the given location on the dielectric surface.

5. The method of claim 1, wherein the acts of claim 1 are performed by:
    mechanically oscillating an atomic force probe at a resonant frequency of the force probe;
    electrically modulating the atomic force probe with a DC signal;
    moving the atomic force probe towards the dielectric surface; and
    measuring the change in resonant frequency of the atomic force probe as the atomic force probe moves towards the dielectric surface.

6. The method of claim 1, wherein the acts of claim 1 are performed by:
    mechanically oscillating an atomic force probe at a resonant frequency of the force probe;
    electrically oscillating the atomic force probe at an applied frequency;
    measuring the change in resonant frequency of the atomic force probe as the atomic force probe is electrically oscillated at the applied frequency; and
    comparing the change in resonant frequency of the force probe as the atomic force probe is electrically oscillated at the applied frequency to the applied frequency to detect differences between the change in resonant frequency of the force probe as the atomic force probe is electrically oscillated at the applied frequency to the applied frequency.

7. The method of claim 1, wherein the acts of claim 1 are performed by:
    mechanically oscillating an atomic force probe at a resonant frequency of the force probe;
    electrically modulating the atomic force probe;
    mechanically modulating the distance between the atomic force probe and the given point on the dielectric surface; and
    measuring the change in resonant frequency of the atomic force probe.

8. The method of claim 7, wherein:
    electrically modulating the atomic force probe is performed by applying an oscillating electrical signal at a first frequency; and
    mechanically modulating the distance between the atomic force probe is performed by varying the distance between the atomic force probe and the given point on the dielectric surface at a second frequency, wherein the second frequency is twice the first frequency and with a phase difference that allows the first frequency to have maximums and minimums at a minimum distance between the atomic force probe and the given point caused by the second frequency; and
    measuring the change in frequency of the atomic force probe comprises detecting changes in an FM modulation of the atomic force probe using a lock-in amplifier reference signal that is 90° out of phase from the first frequency.

9. The method of claim 1, wherein the acts of claim 1 are repeated in a plurality of locations to image electrical characteristics of the dielectric surface.

10. The method of claim 9, further comprising imaging height characteristics of the dielectric surface prior to imaging the electrical characteristics of the dielectric surface such that the height characteristics of the dielectric surface can be used for probe positioning when performing imaging of the electrical characteristics of the dielectric surface.

11. The method of claim 2, wherein if a tunneling event is determined to have occurred, performing spectroscopy measurements to determine the energy of the states in the dielectric surface.

12. The method of claim 11, wherein performing a spectroscopy measurement is performed by ramping a voltage across an atomic force probe and the dielectric surface.

13. The method of claim 12, wherein AC spectroscopy is performed by detecting electrons shuttling back and forth as a function of the ramped voltage.

14. The method of claim 12, wherein DC spectroscopy is performed by detecting frequency shift as a function of the ramped voltage.

15. The method of claim 11, wherein performing a spectroscopy measurement is performed by varying the gap between an atomic force probe and the surface.

16. The method of claim 15, wherein AC spectroscopy is performed by detecting electrons shuttling back and forth as a function of gap height.

17. The method of claim 15, wherein DC spectroscopy is performed by detecting frequency shift as a function of gap height.

18. An apparatus for characterizing electrical properties of a dielectric surface, to detect locations on a dielectric surface where electron tunneling may occur, the apparatus comprising:
an atomic force probe;
a mechanical actuator coupled to the atomic force probe;
a mechanical modulator coupled to the mechanical actuator, the mechanical modulator configured to modulate the mechanical actuator and the atomic force probe at the resonant frequency of the atomic force probe;
an electrical modulator coupled to the atomic force probe;
a feedback sensing circuit coupled to the mechanical modulator, the feedback circuit configured to detect movement of the atomic force probe and to provide information about the movement of the atomic force probe to the mechanical modulator to allow the mechanical modulator to modulate the mechanical actuator and the atomic force probe at the resonant frequency of the atomic force probe as the resonant frequency of the atomic force probe changes as a result of an electron tunneling between the atomic force probe and the dielectric surface; and
an FM detector coupled to the feedback sensing circuit and configured to detect changes in the resonant frequency of the atomic force probe.

19. The apparatus of claim 18, further comprising a first lock in amplifier coupled to the FM detector and a reference signal derived from the electrical modulator, the lock in amplifier configured to detect changes in the FM detector output signal at the frequency of the reference signal when the electrical modulator is providing an AC signal.

20. The apparatus of claim 19, further comprising a second lock in amplifier coupled to a reference signal that is 90° out of phase from the reference signal connected to the first lock in amplifier, wherein the first and second lock in amplifiers can be used to simultaneously detect tunneling events and to measure average surface potential.

21. A method of characterizing a dielectric surface by detecting tunneling events, the method comprising acts of:
applying a first voltage through an atomic force probe at a given location on the dielectric surface, the voltage being of a sufficient strength, and applied within a distance from the dielectric surface where tunneling events are likely to occur;
modulating the atomic force probe at the resonant frequency of the atomic force probe, and
detecting a tunneling event occurring as a result of applying the first voltage at the given location on the dielectric surface by detecting a shift in the resonant frequency of the atomic force probe.

22. The method of claim 21, wherein detecting a tunneling event comprises detecting a change in surface potential at the given location from before the tunneling event to after the tunneling event.

23. The method of claim 21, wherein detecting a tunneling event comprises detecting the movement of a charge carrier from the atomic force probe to or from the dielectric surface.

24. A method of characterizing a dielectric surface by detecting electric surface potential of the surface, the method comprising acts of:
positioning an atomic force probe near the dielectric surface;
mechanically oscillating an atomic force probe at a resonant frequency of the force probe;
electrically modulating the atomic force probe at an electrical modulation frequency; and
measuring an FM modulation of the resonant frequency of the atomic force probe due to the surface potential of the dielectric surface resulting from an electron tunneling between the atomic force probe and the dielectric surface, the FM modulation of the resonant frequency of the atomic force probe being at the electrical modulation frequency.

25. The method of claim 24, performing the acts at a plurality of locations to create an image of the surface potentials of the dielectric surface.

* * * * *